Sept. 28, 1937. H. D. REY 2,094,083
DRIED FRUIT KNEADING MACHINE AND METHOD
Filed June 1, 1936
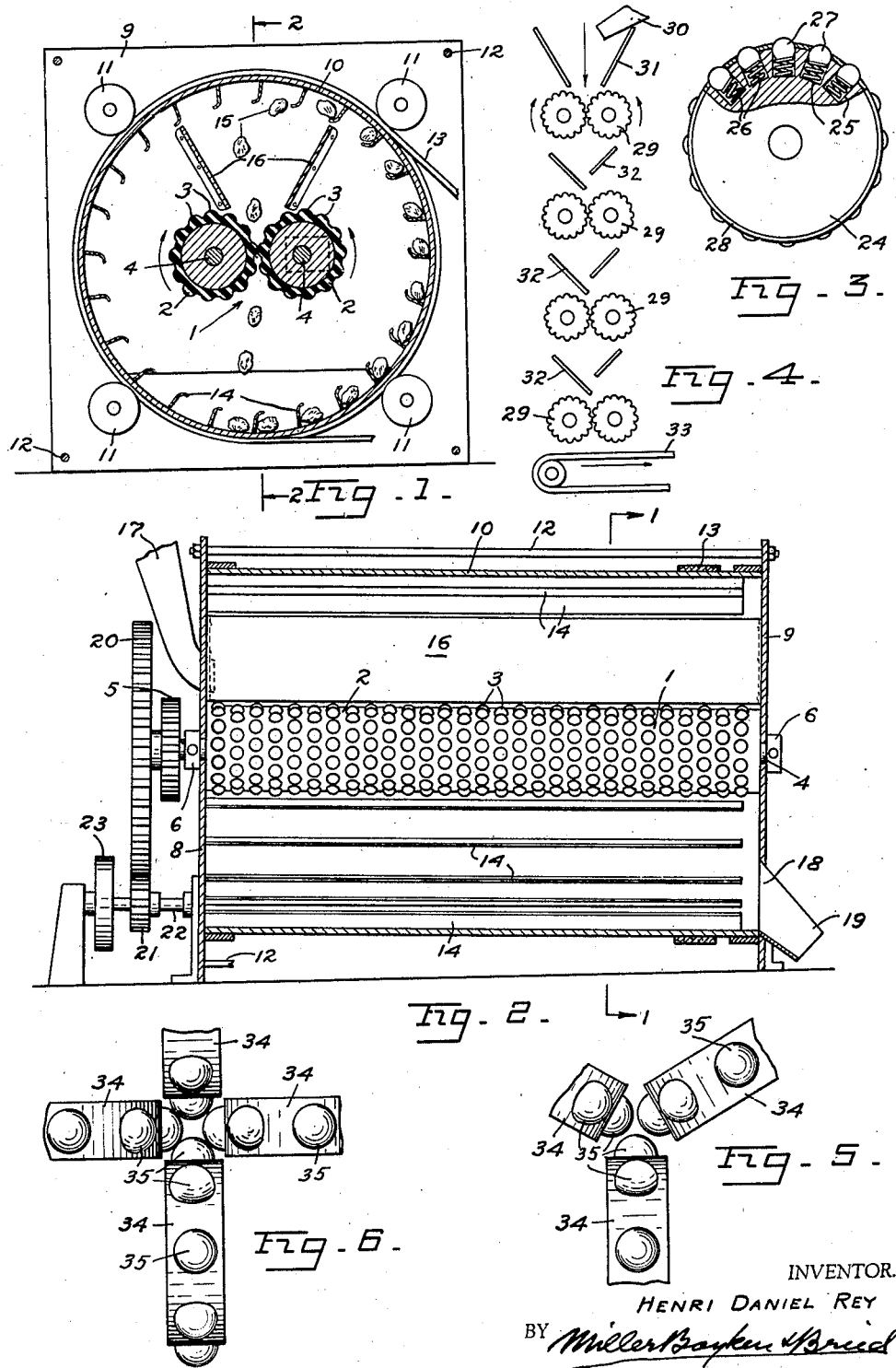
INVENTOR.
HENRI DANIEL REY
BY
ATTORNEY.

Patented Sept. 28, 1937

2,094,083

UNITED STATES PATENT OFFICE 2,094,083

DRIED FRUIT KNEADING MACHINE AND METHOD

Henri Daniel Rey, Papeete, Tahiti, assignor to The Anglo California National Bank of San Francisco, trustee, San Francisco, Calif., a corporation Application June 1, 1936, Serial No. 82,834

13 Claims. (Cl. 99—104)

This invention relates to methods and means for softening dried fruit bodies by physical manipulation as generally disclosed in my copending patent applications filed under Serial Nos. 68,885 and 73,699, and the object of the present invention is to provide improvements in such methods and means. Other objects and advantages of the invention will appear in the following description and accompanying drawing.

In the drawing Fig. 1 is a cross section taken along the line 1—1 of Fig. 2 of a machine for carrying out my improved method of kneading dried fruit bodies.

Fig. 2 is a longitudinal cross section of the machine as seen from the line 2—2 of Fig. 1.

Fig. 3 is an enlarged cross sectional detail of a modified construction of the kneading rolls.

Fig. 4 is a diagrammatic elevation showing a modified general arrangement of the kneading rolls.

Fig. 5 is a plan view showing another modification in the arrangement of the kneading rolls.

Fig. 6 shows a still further modification of the kneading rolls.

Briefly described, the present method of working or physically manipulating dried fruit bodies until they are soft and unctuous is to repeatedly pass common dried fruit, or after slightly steaming or sweating, between rollers studded with resilient lumps or nubs of soft rubber, and which nubs engage the fruit from opposite sides and squeeze it at various points all over the fruit bodies until it is soft and pliable and the pits (in case of dried prunes or other drupes) are loosened from the flesh of the fruit, and what little moisture or juices remain in the dried fruit are worked or disseminated equally through the bodies.

The nubbing rolls may be of solid metal or wood with rubber nubs, or entirely of soft rubber either solid, hollow or pneumatic, or the nubs may be of metal balls spring-compressible into holes drilled all over the surface of the rolls. The rolls may be arranged in various ways, such as several pairs, one above the other, for passage of the fruit through all of them, also a nub roll working against a plain roll will operate on some fruit.

In Figs. 1 and 2 but one pair of nubbing rolls is shown at 1 with the jackets 2 of good gum rubber formed with surface nubs 3 staggered evenly over its entire surface. These rolls may be arranged in a manner to make their nubs always coincide as the rolls are revolved or one roll may revolve somewhat faster than the other to give a twisting action to the fruit and to insure which the rolls are provided with shafts 4 secured to the rolls and each also to one of a pair of meshing pinion gears 5 at either or both ends and which gears may be identical or one may have a few more teeth than the other, and one of the shafts is preferably provided with its bearings or boxes 6 adjustable at one or both ends of the roll for adjusting the rolls toward and from one another slightly as it is contemplated that the rolls be set a little closer toward the discharge end of the machine to thereby bring increasing pressure upon the fruit bodies as they pass through, and which latter effect could also be had if the rolls were slightly tapered, or the nubs slightly longer toward one end of the rolls.

To get more of a slip between the rolls than by having different number of teeth in the roll gears 5 the gears could be entirely omitted and the undriven roll revolved by the fruit bodies from the rotation of the driven roll, but this would not be so good for the more delicate fruits subject to easy injury, as it subjects the fruit bodies to more of an abrading action.

The roll shaft bearings are carried respectively on vertical plates 8, 9 which form end closures for a cylindrical drum 10 which is revolvably mounted on idler rollers 11 carried by the end plates, and the end plates are preferably spaced as by spacing tie rods 12.

The drum is revolved as by a belt 13 and within the drum is a series of short lifting blades 14 of a depth to carry upward as the drum revolves, preferably but a single layer of the fruit 15 being treated, and drop it into a chute or trough 16 guiding it between the nubbing rolls 1 to drop out below for repetition of the cycle until the fruit fed in at one end of the cylinder works its way along by gravity (owing to a slight incline of the drum) towards a discharge opening 18 in end plate 9 and out of chute 19. The fruit is fed into the drum at one end either below or at one side of the nubbing rolls, as from a chute 17, so as to fall first to the bottom of the drum for proper carrying up by the lifting blades 14. The revolving drum will be seen to form an endless conveyor for constantly elevating and dropping the fruit into the rolls.

The nubbing rolls may be driven by any desired means, but here indicated as through means of a large gear 20 secured to one of the roll shafts 4 and meshing with a pinion 21 carried on a countershaft 22 in turn driven from any suitable source of power by a gear or pulley 23.

By the arrangement described the dried fruit bodies will be gently squeezed hundreds or thousands of times between opposed rubber or resilient nubs until the bodies are uniformly soft and unctuous and the pits if any (as in dried prunes, plums, etc.) will be substantially freed from the flesh within the bodies, particularly if the rolls travel at slightly different speeds.

The degree of kneading to which the fruit bodies are subjected will depend on the speed of the machine, its length, and its inclination, as the latter controls the speed of flow of the fruit bodies from the inlet end to the point of final discharge.

Instead of the nubbing rollers being of solid, hollow, or inflated rubber, they may be entirely of metal or with wooden cores and with nubs of metal or other material resiliently urged outwardly by coil compression springs as indicated in Fig. 3 wherein the hub of the roll is indicated at 24 drilled all over with staggered holes 25 in which are positioned compression springs 26 urging metal balls 27 outwardly to the limit prescribed by restricted openings in an outer metal sleeve or shell 28 through which the balls cannot pass.

For some grades of very dry, tough, fruit the rolls and nubs may be of almost rigid material, or entirely of metal, though the resilient construction is much preferred as it will yield better to the fruit without danger of cracking the pits, especially where the bodies crowd one another as they do at times. For some kinds of dried fruit such as halved fruit bodies, one of the kneading rolls may be plain-surfaced and the other roll only provided with nubs.

Instead of mounting the nubbing rolls within a drum as in Figs. 1 and 2, a series of pairs of rolls may be mounted one above the other as per arrangement shown in Fig. 4 wherein there are four pairs of nubbing rolls 29 all geared together or otherwise operated simultaneously as described, by means not shown, and consecutively receiving the fruit fed to the upper pair of rolls from a feeding chute 30 and guide 31, and the fruit bodies preferably turned over between each pair of rolls as by wire fingers or rakes 32, for final carrying away by a conveyor 33, or if desired several sets of superimposed rolls as per Fig. 4 may be used in a drum as per Fig. 1 instead of the single pair there shown.

Also, instead of long rolls being used, there may be three or four narrow rolls or wheels as at 34 in Figs. 5 and 6 respectively with their nubs 35 directed close together so as to engage the fruit bodies from several points simultaneously as the same are fed single file therethrough. The nubbing wheels of Figs. 5 and 6 are, of course, to be suitably geared together, synchronously or otherwise, by means not shown, and they may be in superimposed arrangement as per Fig. 4 so as to avoid returning the fruit to the top for repeated passing through as required in the drum type of machine of Figs. 1 and 2.

Having thus described my improvements in dried fruit kneading methods and apparatus, what I claim is:

1. The method of treating dried fruit which comprises passing the dried fruit bodies repeatedly between opposed approaching and receding nubs until the bodies are soft and pliable throughout yet without substantial breaking of the outer layer of the bodies.

2. The method of treating dried fruit which comprises subjecting the dried fruit bodies to a mechanical nubbing action under pressure at various points over the bodies until they are rendered soft and pliable throughout yet without substantial breaking of the outer layer of the bodies.

3. The method of treating dried fruit which comprises subjecting the dried fruit bodies to a mechanical nubbing action under pressure between opposed resilient nubbing members at various points over the bodies until they are rendered soft and pliable throughout yet without substantial breaking of the outer layers of the bodies.

4. The method of treating dried fruit which comprises subjecting the dried fruit bodies to a mechanical nubbing action under pressure between opposed soft rubber nubbing members at various points over the bodies until they are rendered soft and pliable throughout yet without substantial breaking of the outer layers of the bodies.

5. A machine for treating dried fruit comprising a pair of rolls arranged for passage of the fruit bodies therebetween, series of spaced nubs projecting from the surface of the rolls for impinging the fruit bodies, means for rotating the rolls, and means for directing the fruit bodies for repeated passage between the rolls.

6. A machine for treating dried fruit comprising a pair of rolls arranged for passage of the fruit bodies therebetween, series of spaced nubs projecting from the surface of the rolls for impinging the fruit bodies, means for rotating the rolls, and means for directing the fruit bodies for repeated passage between the rolls, the nubs on said rolls being resilient.

7. A machine for treating dried fruit comprising a pair of rolls arranged for passage of the fruit bodies therebetween, series of spaced nubs projecting from the surface of the rolls for impinging the fruit bodies, means for rotating the rolls, and means for directing the fruit bodies for repeated passage between the rolls, the nubs and the surface of the rolls being of soft rubber.

8. A machine for treating dried fruit comprising a pair of rolls arranged for passage of the fruit bodies therebetween, series of spaced nubs projecting from the surface of the rolls for impinging the fruit bodies, means for rotating the rolls, means for directing the fruit bodies for repeated passage between the rolls, and means maintaining the nubs of the two rolls in aligned confronting relation during the rotation of the rolls.

9. A machine for treating dried fruit comprising a pair of rolls arranged for passage of the fruit bodies therebetween, series of spaced nubs projecting from the surface of the rolls for impinging the fruit bodies, means for rotating the rolls, and conveyor means arranged to continuously carry the fruit bodies from below to a point above said rolls and discharging the bodies for passage downward between the rolls.

10. A machine for treating dried fruit comprising a pair of rolls arranged for passage of the fruit bodies therebetween, series of spaced nubs projecting from the surface of the rolls for impinging the fruit bodies, means for rotating the rolls, and conveyor means arranged to continuously carry the fruit bodies from below to a point above said rolls and discharging the bodies for passage downward between the rolls, said conveyor provided with pockets holding substantially but a single layer of fruit bodies for delivery to the rolls as a single layer.

11. A machine for treating dried fruit comprising a pair of rolls arranged for passage of the fruit bodies therebetween, series of spaced nubs projecting from the surface of the rolls for impinging the fruit bodies, means for rotating the rolls, and conveyor means arranged to continuously carry the fruit bodies from below to a point above said rolls and discharging the bodies for passage downward between the rolls, said conveyor taking the form of a rotary cylinder within which the rolls are positioned, and lifting blades on the inner wall of the cylinder for carrying the fruit bodies upward.

12. A machine for treating dried fruit comprising a substantially horizontally disposed rotary drum, means for rotating the drum, means within the drum arranged to continually lift fruit bodies from the lower part of the drum and drop them from above, and a pair of fruit kneading rolls arranged to intercept the falling bodies, and means for rotating the rolls for passing the fruit therebetween for discharge into the drum.

13. In a machine for kneading dried fruit bodies to pliable consistency, a pair of rolls provided with spaced projecting nubs arranged and adapted for engaging the fruit bodies passed between the rolls to knead the bodies to soft pliable condition and said rolls arranged for bringing gradually increased pressure against the bodies from one end of the rolls toward the other end.

HENRI DANIEL REY.